US008640749B2

(12) United States Patent
Sörvik

(10) Patent No.: US 8,640,749 B2
(45) Date of Patent: Feb. 4, 2014

(54) HARVESTING ARRANGEMENT FOR TREE HARVESTING

(76) Inventor: Bengt Sörvik, Uppsala (SE)

(*) Notice: Subject to any disclaimer, the term of this patent is extended or adjusted under 35 U.S.C. 154(b) by 298 days.

(21) Appl. No.: 12/990,127

(22) PCT Filed: Apr. 28, 2009

(86) PCT No.: PCT/SE2009/050445
§ 371 (c)(1),
(2), (4) Date: Oct. 28, 2010

(87) PCT Pub. No.: WO2009/134201
PCT Pub. Date: Nov. 5, 2009

(65) Prior Publication Data
US 2011/0126941 A1 Jun. 2, 2011

(30) Foreign Application Priority Data
Apr. 30, 2008 (SE) .................................... 0800984

(51) Int. Cl.
A01G 23/08 (2006.01)
A01G 23/081 (2006.01)
(52) U.S. Cl.
CPC .................................. A01G 23/081 (2013.01)
USPC ........................................... 144/4.1; 144/335
(58) Field of Classification Search
USPC ............ 144/4.1, 335, 336, 24.13, 34.1, 338, 144/340, 341, 343, 208.1, 208.2, 208.4; 101/4, 226, 227, 228
See application file for complete search history.

(56) References Cited

U.S. PATENT DOCUMENTS

| 3,356,113 | A | * | 12/1967 | Del Perugia | 144/338 |
| 3,970,124 | A | * | 7/1976 | Hamilton | 144/4.1 |
| 4,173,138 | A | * | 11/1979 | Main et al. | 72/349 |
| 6,374,877 | B1 | * | 4/2002 | Wildey | 144/4.1 |
| 6,691,752 | B2 | * | 2/2004 | DiSabatino | 144/34.1 |
| 2005/0061400 | A1 | * | 3/2005 | Happonen | 144/343 |
| 2007/0113925 | A1 | * | 5/2007 | DiSabatino | 144/4.1 |

FOREIGN PATENT DOCUMENTS

| DE | 8914891 U1 | 4/1990 |
| SE | 520289 | 2/2002 |
| WO | 9007870 A1 | 7/1990 |
| WO | 9112711 A1 | 9/1991 |
| WO | 9923873 A1 | 5/1999 |
| WO | 02/13597 | 2/2002 |

* cited by examiner

Primary Examiner — Dana Ross
Assistant Examiner — Matthew G Katcoff
(74) Attorney, Agent, or Firm — Dilworth & Barrese, LLP.

(57) ABSTRACT

The invention relates to a harvesting arrangement (1) for tree harvesting comprising gripping members (2) for holding a tree trunk, a cutting device (3) for crosscutting a tree trunk held by the gripping members and a marking device (10) for applying an identification marking on the end surface of a crosscut end of a tree trunk held by the gripping members. The marking device comprises a striking arm (11) provided with a striking head (12) at its outer free end, and an actuating member (30) for actuating the striking arm (11). The striking arm is pivotable about an axis of rotation (14) under the effect of the actuating member from a resting position to a striking position so as to thereby allow the striking head to hit against the end surface of a crosscut end of a tree trunk in order to apply an identification marking on said end surface.

26 Claims, 9 Drawing Sheets

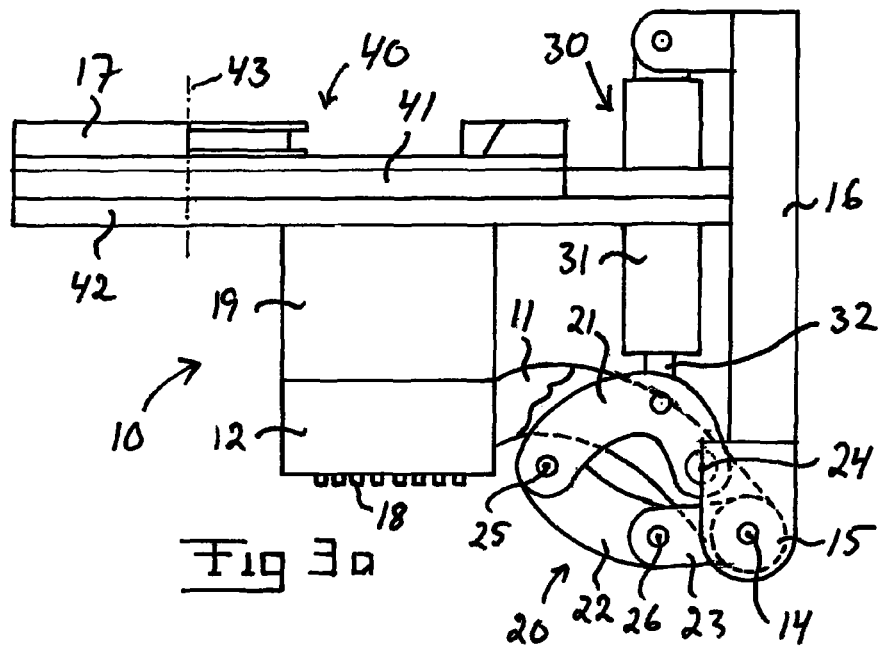
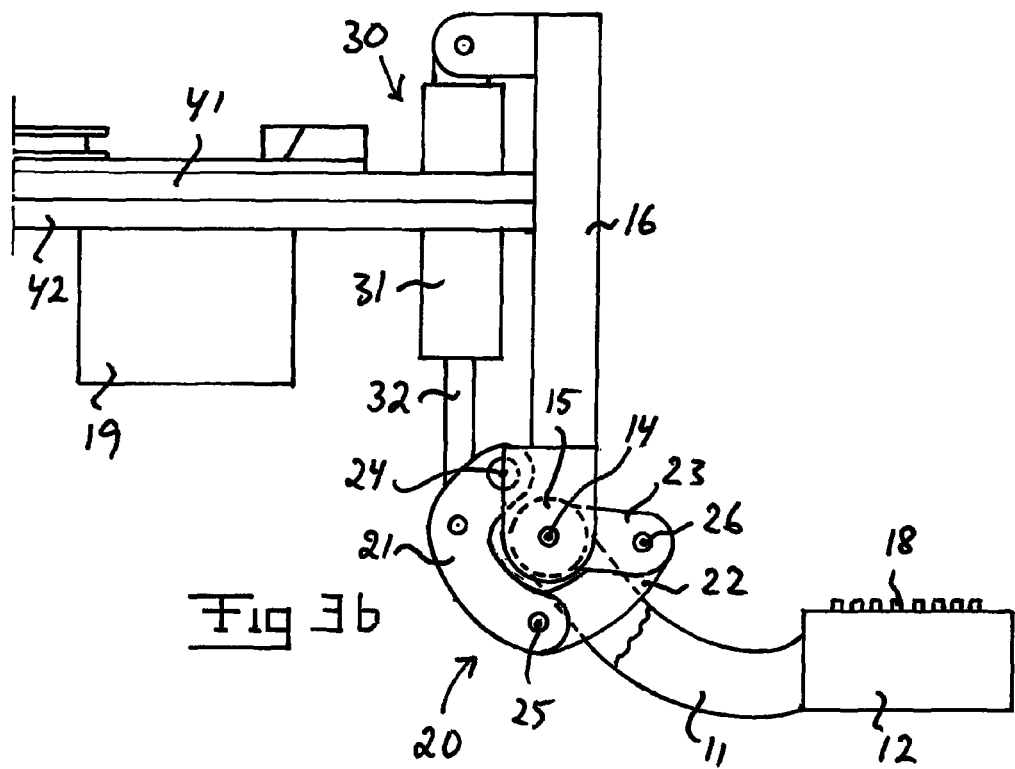

HARVESTING ARRANGEMENT FOR TREE HARVESTING

FIELD OF THE INVENTION AND PRIOR ART

The present invention relates to a harvesting arrangement for tree harvesting.

From WO 99/23873 A1 is previously known a system enabling a rational forest harvesting. According to one aspect of this system, the forest harvesting is carried out by means of a harvesting machine comprising a vehicle and a harvesting arrangement mounted thereon, the vehicle being provided with a computer arrangement adapted to register quality and/or size concerning harvested logs. In connection with the felling of a tree, the position of the harvesting machine is determined, for instance by means of a GPS-equipment, and a log obtained from the tree is marked by a marking device with this position information or a code by means of which the log is associatable to the position information. The position information or the code applied on a log may be stored in a database associated with data concerning quality and/or size of the log in question. In this way, it will be possible to treat the logs as products having an identity of origin. For an efficient implementation of this type of system, there is a need for a marking device which makes it possible to apply an identification marking on a log in a simple and rapid manner in connection with the harvesting.

SUMMARY OF THE INVENTION

The object of the present invention is to provide a harvesting arrangement for tree harvesting, by means of which identification markings in a simple and efficient manner may by applied on a log obtained from a felled tree.

According to the invention, this object is achieved by a harvesting arrangement having the features defined herein.

The harvesting arrangement of the invention comprises gripping members for holding a tree trunk, a cutting device for crosscutting a tree trunk held by the gripping members and a marking device for applying an identification marking on the end surface of a crosscut end of a tree trunk held by the gripping members. The marking device comprises a striking arm provided with a striking head at its outer free end, and an actuating member for actuating the striking arm. The striking arm is pivotable about an axis of rotation under the effect of the actuating member from a resting position to a striking position so as to thereby allow the striking head to hit against the end surface of a crosscut end of a tree trunk held by the gripping members in order to apply an identification marking on said end surface. Thus, the striking arm with the striking head makes it possible to apply a marking by a rapid striking motion on the end surface of a tree trunk held by the gripping members of the harvesting arrangement. The striking arm is then returned in the opposite direction back to its resting position so as to be in position for delivering a new marking stroke towards the next crosscut end surface of the tree trunk or towards the end surface of a new tree trunk gripped by the gripping members of the harvesting arrangement.

According to an embodiment of the invention, the actuating member is arranged to act on the striking arm through a link arrangement, which is configured to accelerate the striking arm during the final part of the striking arm's travel path from the resting position to the striking position. The link arrangement makes it possible to enhance the striking efficiency of the striking arm so as to thereby ensure that the striking head hits the end surface of the tree trunk with sufficient force for achieving the desired marking.

According to another embodiment of the invention, the link arrangement is configured to decelerate the striking arm during the final part of the striking arm's travel path from the striking position to the resting position. Hereby, the striking arm may be returned to the resting position in a rapid return motion while being decelerated at the end of the return motion.

According to another embodiment of the invention, the striking arm is actuated by an actuating member in the form of a hydraulic cylinder or a hydraulic motor or pump. Hereby, the actuating member may be connected to the ordinary hydraulic system of the harvesting arrangement so as to be driven by hydraulic fluid supplied by this hydraulic system, which facilitates the installation of the marking device in a harvesting arrangement of conventional type.

According to another embodiment of the invention, the marking device is secured to a movable support, which is movably mounted to the harvesting arrangement so as to allow an adjustment of the position of the striking arm in relation to the end surface of a crosscut end of a tree trunk held by the gripping members. Hereby, the striking arm may be adjusted into a suitable position so as to make the striking head hit a suitable area on the end surface of the tree trunk to be marked.

Another embodiment of the invention is characterized in:
that the harvesting arrangement comprises diameter establishing means for establishing information as to the diameter of a tree trunk held by the gripping members;
that the harvesting arrangement comprises one or more actuating members for regulating the position of the movable support; and
that the harvesting arrangement comprises an electronic control unit which is arranged to control said one or several actuating members in dependence on information as to the diameter of a tree trunk held by the gripping members.

Hereby, the position of the striking arm may be automatically adjusted in dependence on the diameter of a tree trunk held by the gripping members so as to ensure that the striking head hits a suitable area on the end surface of the tree trunk.

Further advantages as well as advantageous features of the harvesting arrangement of the present invention will appear from the following description and the dependent claims.

BRIEF DESCRIPTION OF THE DRAWINGS

With reference to the appended drawings, a specific description of preferred embodiments of the invention cited as examples follows below. In the drawings:

FIG. 3a is a schematic lateral view illustrating a marking device included in the harvesting arrangement of FIG. 1, as seen with the striking arm of the marking device in a resting position, FIG. 3b shows the marking device of FIG. 3a with the striking arm in a striking position.

DETAILED DESCRIPTION OF PREFERRED EMBODIMENTS OF THE INVENTION

Figure 1:
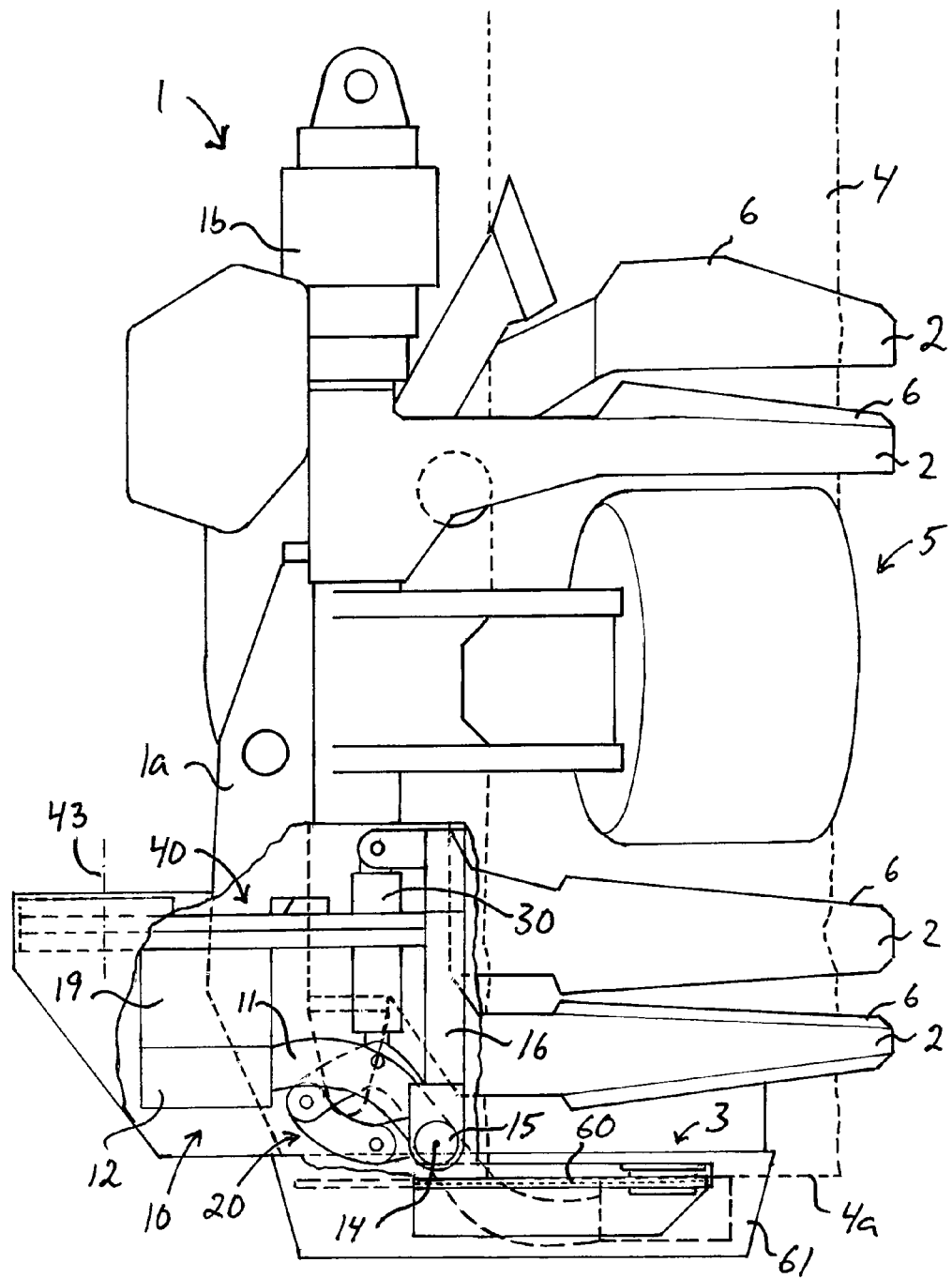
FIG. 1 is a schematic lateral view illustrating a harvesting arrangement according to a first embodiment of the present invention, as seen in its position for holding a tree trunk in a vertical direction.

FIG. 1 schematically illustrates a harvesting arrangement 1 for tree harvesting according to an embodiment of the present invention. This harvesting arrangement 1 is in a conventional manner intended to be carried by a crane mounted to a forest vehicle. The forest vehicle may for instance constitute a harvester. In the illustrated example, the harvesting arrangement 1 is a so-called one grip harvesting arrangement, i.e. a harvesting arrangement adapted to grip a standing tree by means of gripping members 2, cut the tree by means of a cutting device 3, lay the tree trunk 4 down to an essentially horizontal position (see FIG. 2), and then by means of feeding means 5 drive the tree trunk through the harvesting arrangement while simultaneously delimbing the tree trunk by means of delimbing members 6. In the illustrated example, the delimbing members 6 consist of delimbing knives arranged on the gripping members 2. In the illustrated example, the feeding means 5 of the harvesting arrangement comprises two rotatably driven feeding wheels 5a, 5b adapted to come into engagement with the tree trunk on opposite sides thereof. The tree trunk 4 may be crosscut into individual logs by means of the cutting device 3. However, the invention is also applicable to a so-called full log handling, i.e. where the harvesting arrangement is utilised to cut the tree off and fell it, but whereupon no crosscutting of the tree trunk into smaller logs is carried out.

Figure 2:
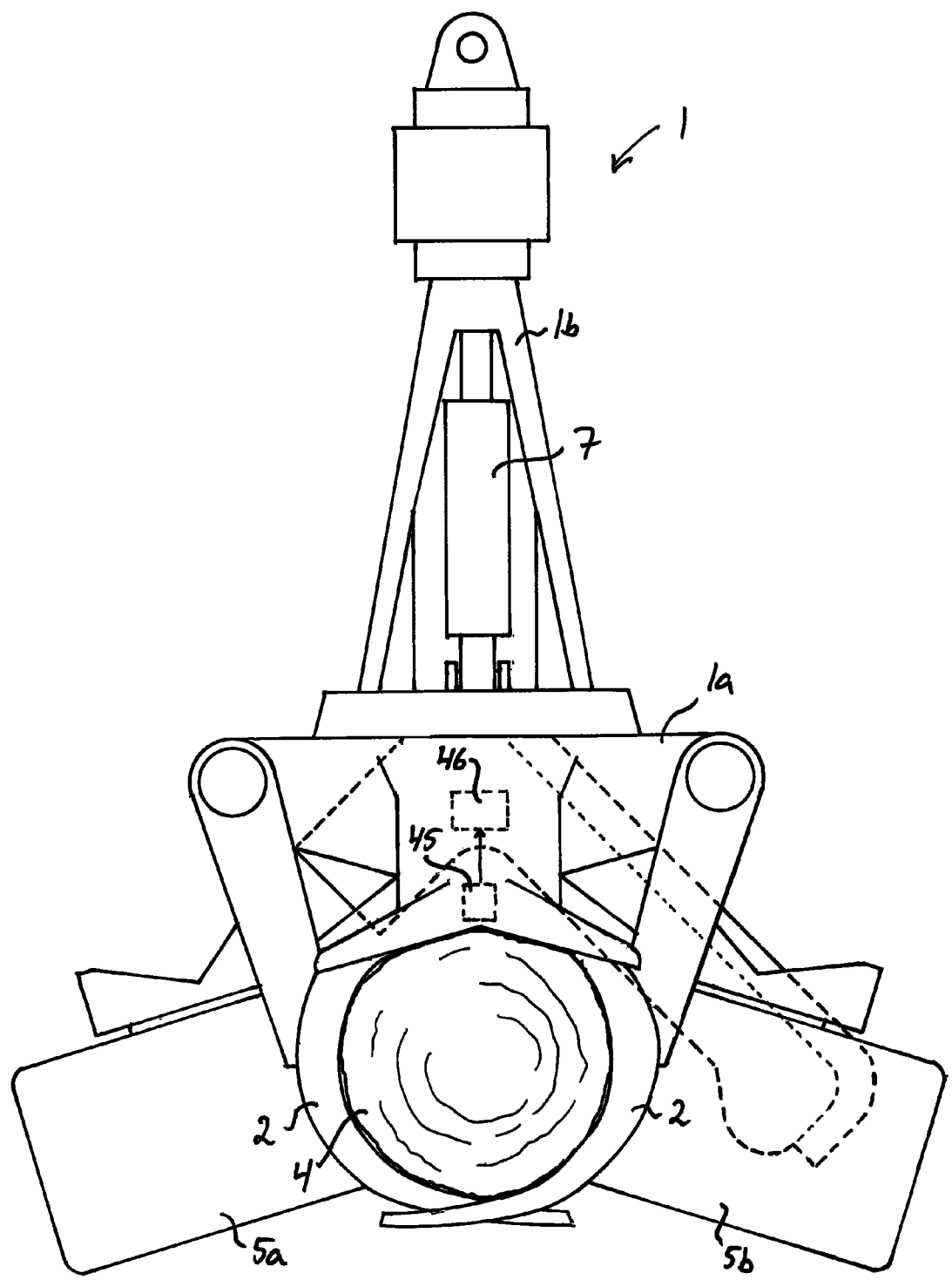
FIG. 2 is a schematic front view of the harvesting arrangement according to FIG. 1, as seen in the position when the tree trunk has been turned to a horizontal position.
Figure 4:
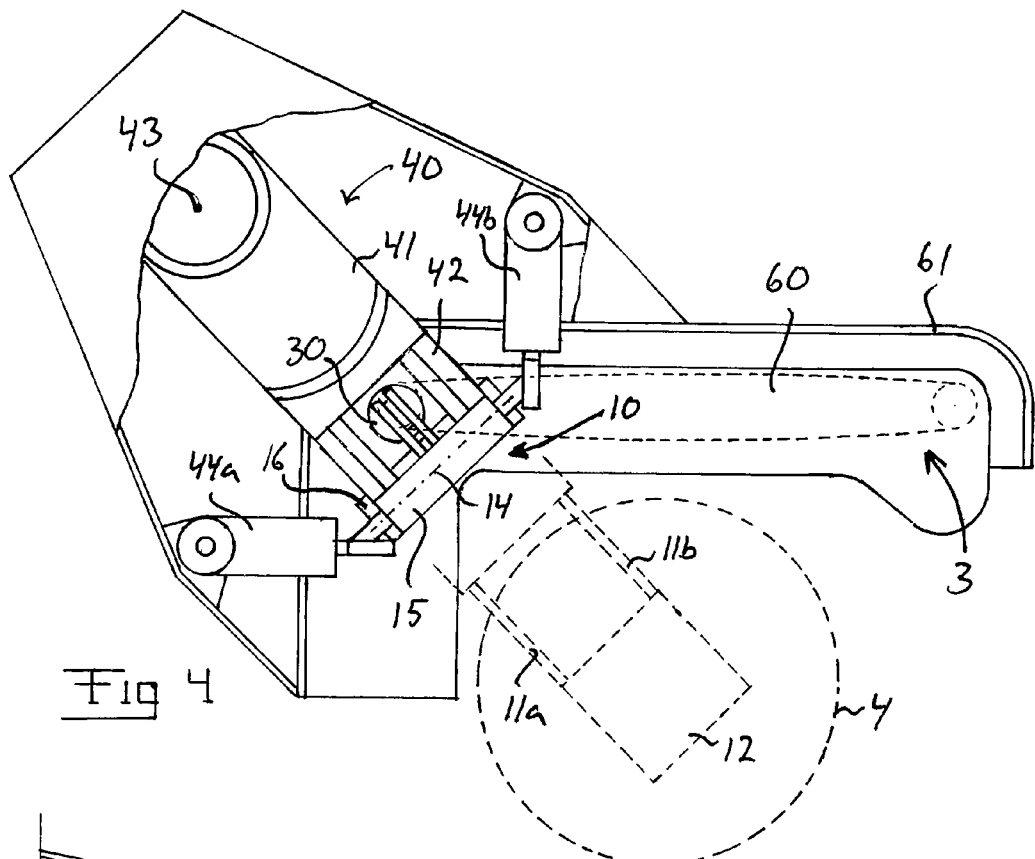
FIG. 4 shows a possible location of a marking device in relation to the cutting device of the harvesting arrangement.
Figure 5:
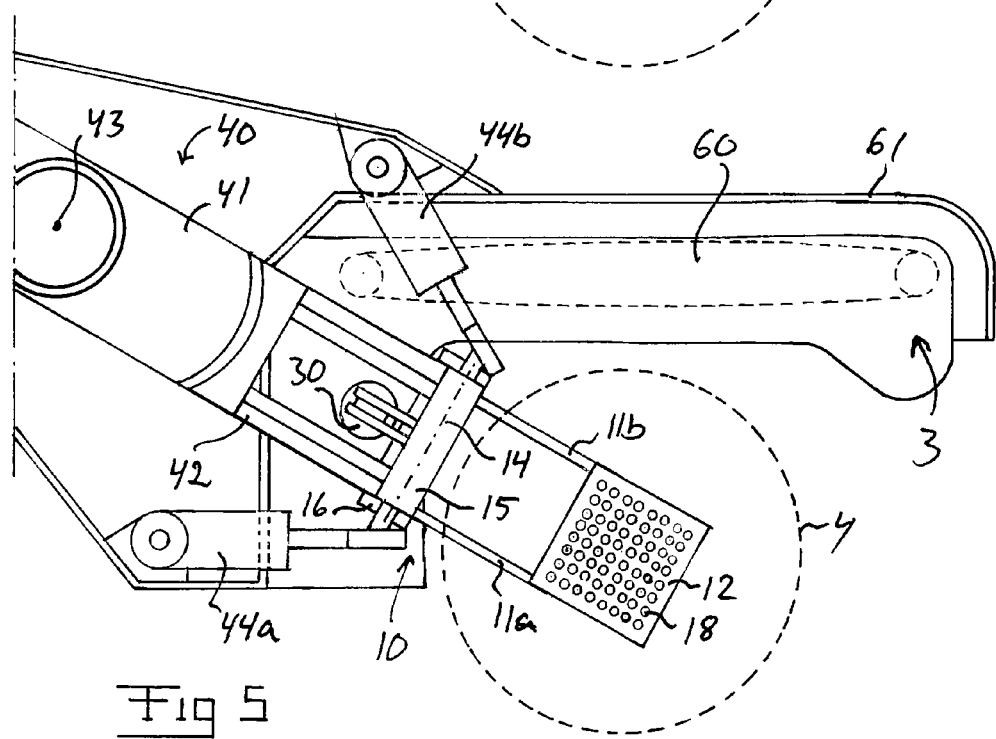
FIG. 5 shows an alternative location of a marking device in relation to the cutting device of the harvesting arrangement.

In FIG. 1, the harvesting arrangement 1 is shown with a crosscut tree trunk 4 (indicated with broken lines) held by the gripping members 2 with the tree trunk extending in vertical direction. In FIG. 2, the harvesting arrangement 1 and a tree trunk 4 held therein are shown after the harvesting arrangement has laid the tree trunk down to horizontal position. The manoeuvring from vertical to horizontal position is carried out by means of a power member 7 in the form of a hydraulic cylinder, which is adapted to turn the part 1a of the harvesting arrangement in which the log 4 is held in relation to the other part 1b of the harvesting arrangement that is attached to the crane of the forest vehicle. With respect to the parts described so far, the harvesting arrangement 1 is of conventional design.

The harvesting arrangement 1 comprises a marking device 10 for applying an identification marking, e.g. in the form of a suitable code, on the end surface 4a of a crosscut end of a tree trunk 4 held by the gripping members 2. Thus, a log to be formed from a tree trunk 4 that is processed by means of the harvesting arrangement 1 may be provided with an identification marking by means of this marking device 10. The identification marking is applied on the frontal end surface of the log before the log is cut off from the tree trunk 4 and allowed to fall to the ground from the harvesting arrangement 1. The identification marking is suitably associated to established and stored information as to the growth location of the tree from which the log is obtained, for instance in a manner described in WO 99/23873 A1, so as to make it possible to determine the place of origin of a marked log with the aid of the marking. In connection with the felling, information concerning the place of origin, quality, size, seller, buyer etc. of the log can be stored associated to the identification marking, in which case such information can be retrieved in connection with a later identification of the log. The identification marking can also be utilised in order to follow the movement of the log from the felling to the final customer.

Figure 6:
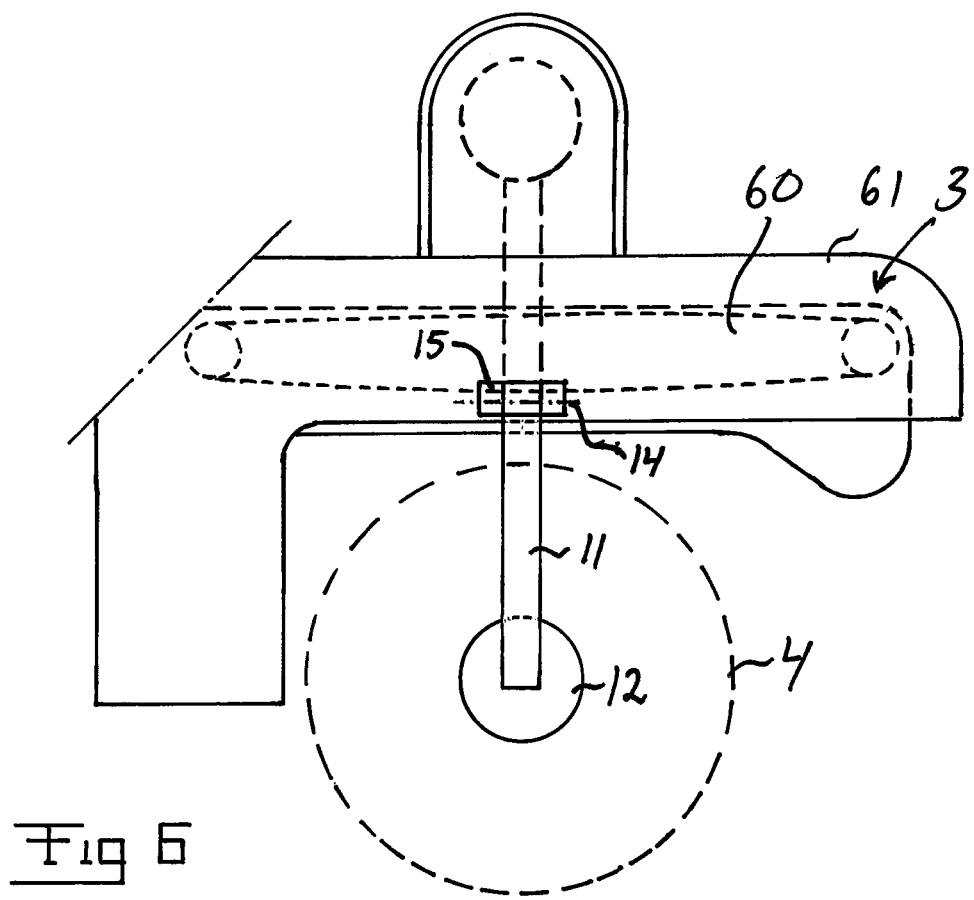
FIG. 6 shows another alternative location of a marking device in relation to the cutting device of the harvesting arrangement.
Figure 7:
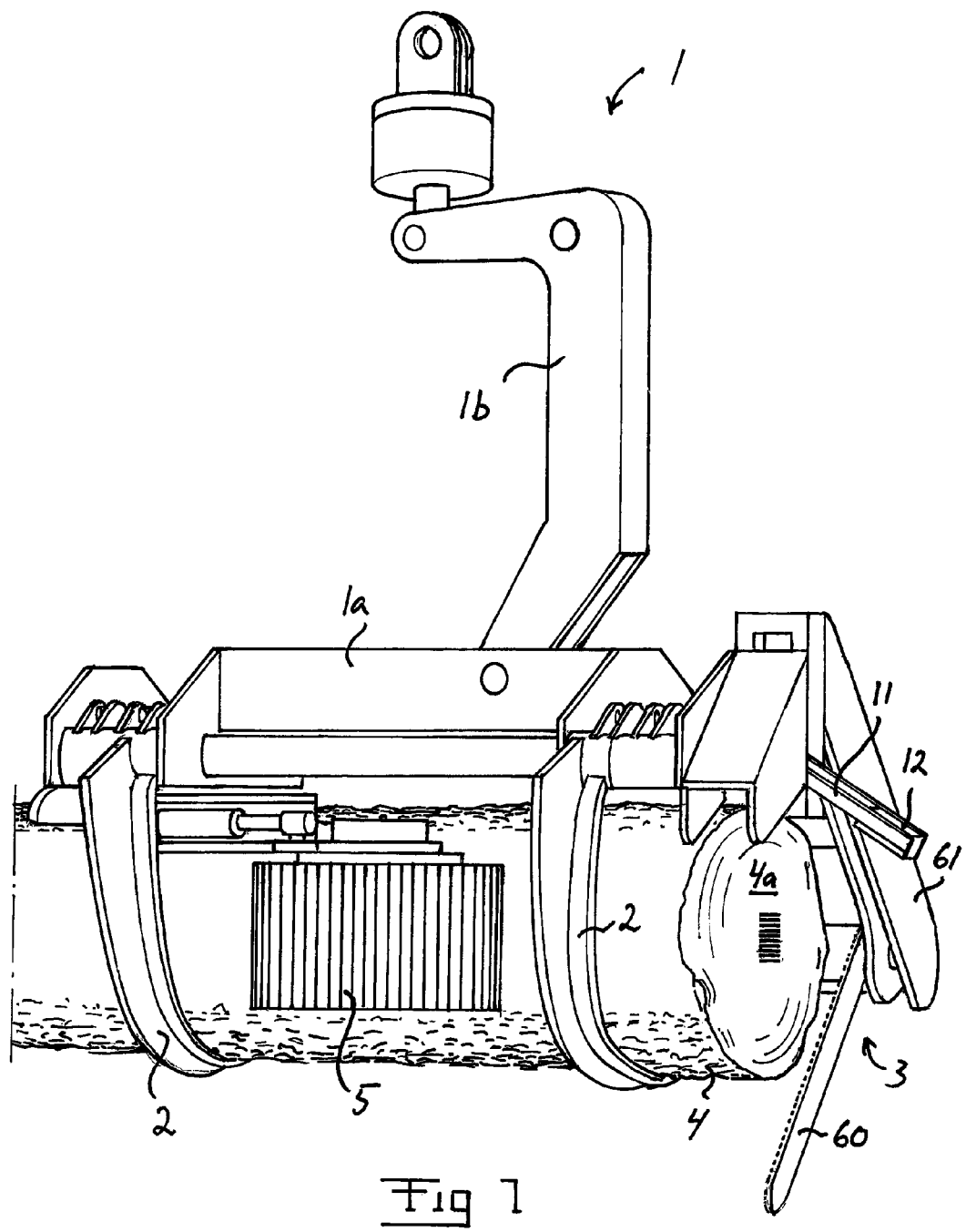
FIG. 7 is a schematic perspective view illustrating a harvesting arrangement according to a second embodiment of the present invention.
Figure 8:
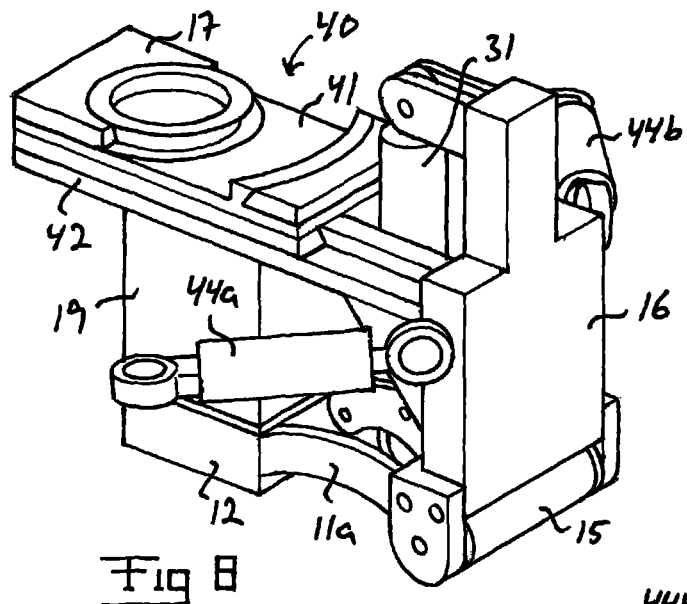
FIG. 8 is a perspective view illustrating the marking device of FIG. 3a and its movable support.
Figure 9:
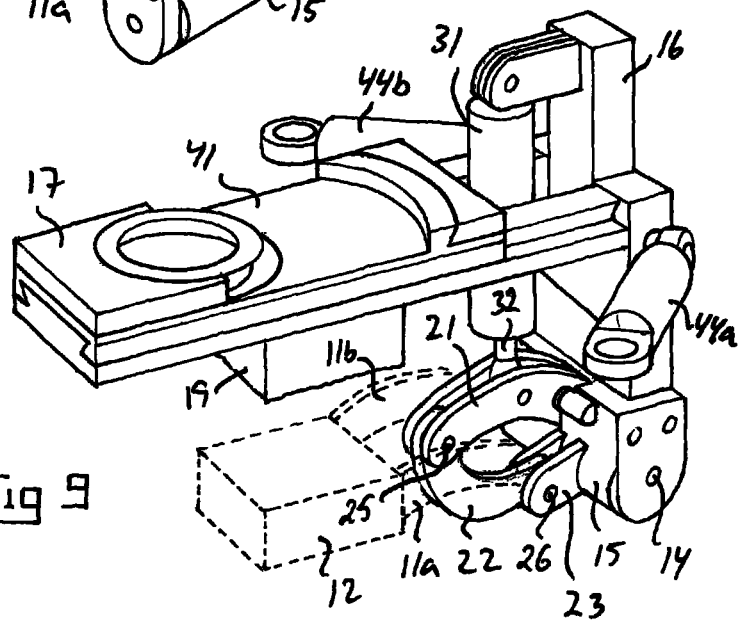
FIGS. 9 and 10 are perspective views illustrating parts included in the marking device and the movable support of FIG. 8.
Figure 10:
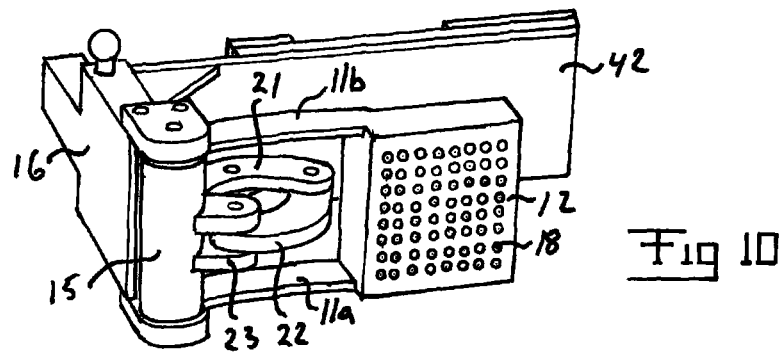

The marking device 10 comprises a striking arm 11 provided with a striking head 12 at its outer free end. In the illustrated embodiments, the striking arm 11 is fixedly secured to a rotatably mounted shaft 15 at its inner end. In the embodiments illustrated in FIGS. 4, 5, 7 and 8-10, the striking arm 11 comprises two parallel shanks 11a, 11b extending between the shaft 15 and the striking head 12, but the striking arm 11 could alternatively comprise one single shank extending between the shaft 15 and the striking head 12, as illustrated in FIG. 6.

The striking arm 11 is actuated by means of an actuating member 30, 30', 30". The striking arm 11 is pivotable, under the effect of the actuating member 30, 30', 30", about an axis of rotation 14 from a resting position (see FIG. 3a) to a striking position (see FIG. 3b) so as to thereby allow the striking head 12 to hit against the end surface 4a of a crosscut end of a tree trunk held by the gripping members 2 in order to apply an identification marking on said end surface. The axis of rotation 14 extends perpendicularly to the longitudinal direction of a tree trunk 4 held by the gripping members 2. In FIG. 1, the striking arm 11 and the striking head 12 are shown in continuous lines in the resting position and in broken lines in the striking position. When they are in the resting position, the striking arm 11 and the striking head 12 are out of the way of a tree trunk 4 held by the gripping members 2 and the tree trunk may then be advanced forwards along the harvesting arrangement 1 by the feeding means 5 without being obstructed by the striking arm 11 or the striking head 12.

In the illustrated embodiments, the striking head 12 is arranged to rest against a support member 19 when the striking arm 11 is in the resting position.

The actuating member 30, 30', 30" is suitably arranged to act on the striking arm 11 through a link arrangement 20, which is configured to accelerate the striking arm 11 during the final part of the striking arm's travel path from the resting position to the striking position. The link arrangement 20 is with advantage also configured to decelerate the striking arm 11 during the final part of the striking arm's travel path from the striking position to the resting position.

In the illustrated embodiments, the link arrangement 20 comprises three links 21-23 arranged in series with each other between a base 16 and the shaft 15. A first link 21 has a first end articulately connected to the base 16 through a first joint 24 and a second end articulately connected to a first end of a second link 22 through a second joint 25. The second link 22 has a second end articulately connected to a first end of a third link 23 through a third joint 26. The third link 23 has a second end fixedly secured to the shaft 15. Each one of said joints 24-26 forms an axis of rotation extending in parallel with the axis of rotation 14 of the shaft 15. In the illustrated embodiments, the actuating member 30, 30', 30" is arranged to act on the first link 21. However, the actuating member 30, 30', 30" could alternatively be arranged to act on the second link 22.

In the embodiments illustrated in FIGS. 1-10, the actuating member 30 is a hydraulic cylinder, which has a cylinder part 31 articulately connected to the base 16 and a piston rod 32 articulately connected to a link 21 of the link arrangement 20. The hydraulic cylinder could alternatively be arranged in the opposite direction, i.e. with the piston rod 32 connected to the base 16 and the cylinder part 31 connected to a link 21 of the link arrangement 20. The hydraulic cylinder may be connected to a pneumatic or hydraulic accumulator for boosting the acceleration of the piston rod 32 during the striking motion.

Figure 11A:
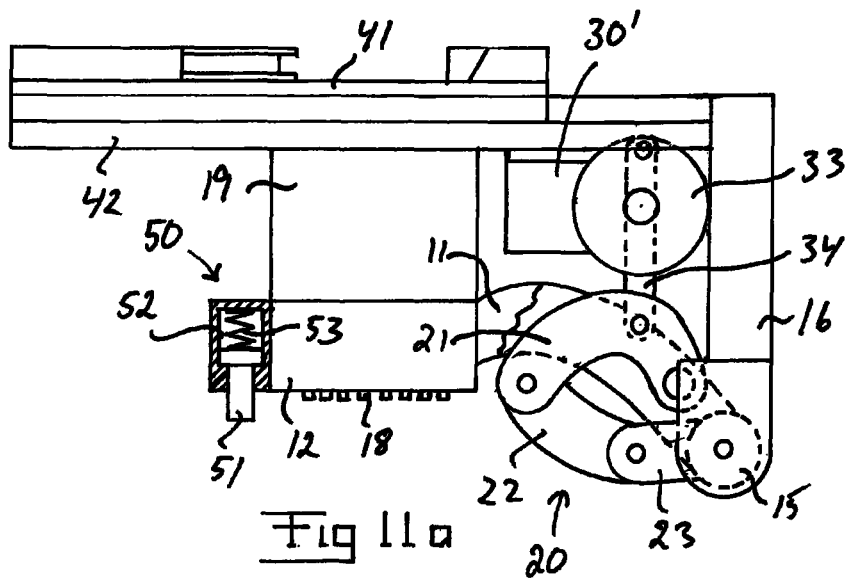
FIG. 11a is a schematic, partly cut lateral view illustrating an alternative type of marking device for a harvesting arrangement according to the present invention, as seen with the striking arm of the marking device in a resting position.
Figure 11B:
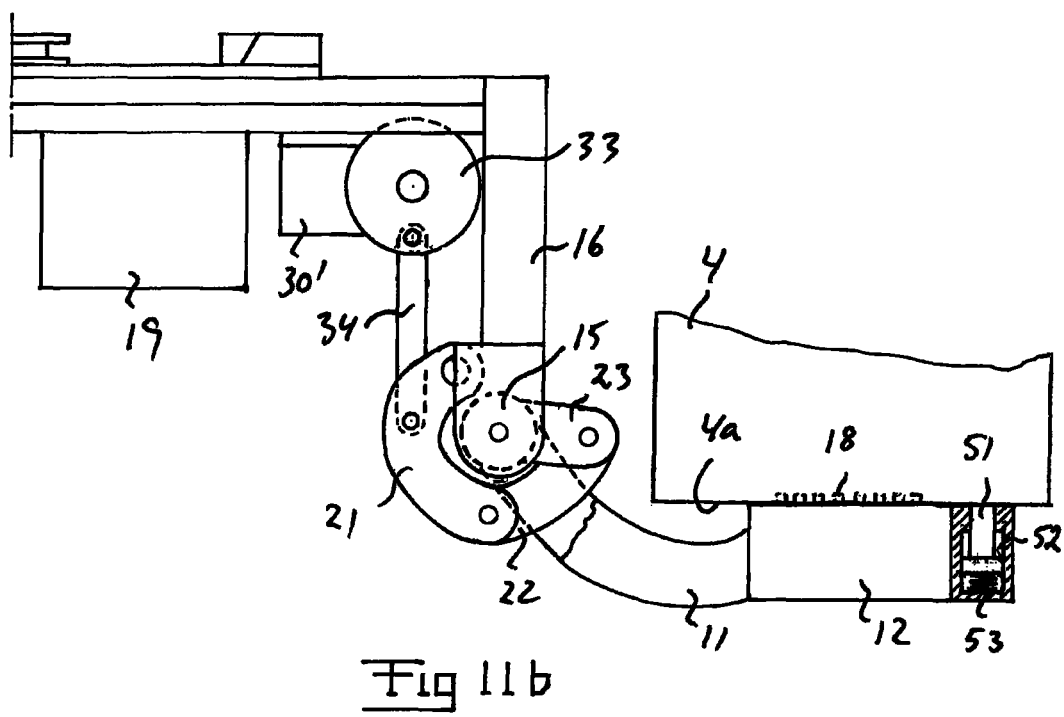
FIG. 11b shows the marking device of FIG. 11a with the striking arm in a striking position.

In the embodiment illustrated in FIGS. 11a and 11b, the actuating member 30' is a hydraulic motor or pump, which is arranged to act on the link arrangement 20 through a flywheel 33 and a reciprocating actuating rod 34. The flywheel 33 is connected to the output shaft of the hydraulic motor/pump 30', directly or through a gear, so as to be driven in rotation by the hydraulic motor/pump. The actuating rod 34 is at one end articulately connected to the flywheel 33 and at the other end articulately connected to a link 21 of the link arrangement 20. The flywheel 33 is arranged to transfer the rotating motion of the output shaft of the hydraulic motor/pump 30' into a reciprocating motion of the actuating rod 34. During one revolution of the flywheel 33, the actuating rod 34 is advanced and retracted so as to make the striking arm 11 move from the resting position (see FIG. 11a) to the striking position (see FIG. 11b) and then back to the resting position. The flywheel 33 is balanced in a suitable manner so as to affect the striking motion of the striking arm 11 in an appropriate manner.

Figure 12:
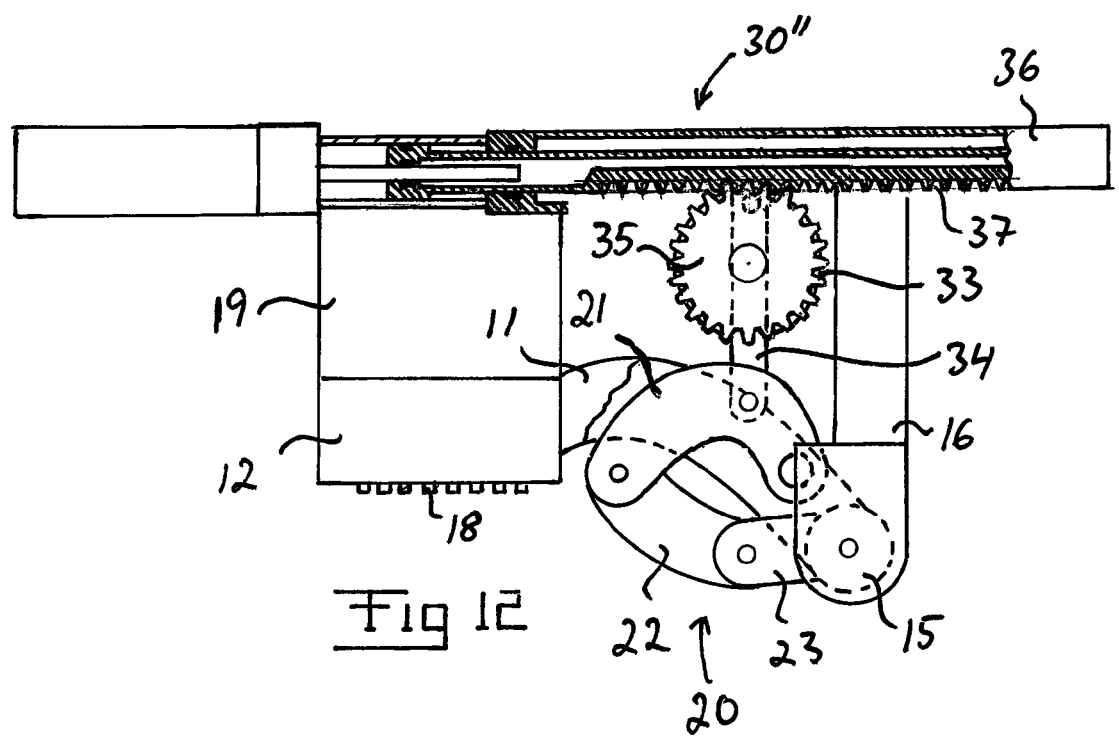
FIG. 12 is a schematic, partly cut lateral view illustrating another alternative type of marking device for a harvesting arrangement according to the present invention.

In the embodiment illustrated in FIG. 12, the actuating member 30" is a hydraulic cylinder, which is arranged to act on the link arrangement 20 through a gearwheel 35, a flywheel 33 and a reciprocating actuating rod 34. The flywheel 33 is fixed to the same shaft as the gearwheel 35 so as to rotate together with the gearwheel. The cylinder part 36 of the hydraulic cylinder 30" is cogged so as to form a rack gearing 37, which is in engagement with the gearwheel 35. The cylinder part 36 is hydraulically displaceable to and fro so as to rotate the gearwheel 35 and thereby the flywheel 33 to and fro. The gearwheel 35 and the rack gearing 37 may be adapted to each other in such a manner that the gearwheel 35 and thereby the flywheel 33 is rotated approximately 360° in one direction during a movement of the cylinder part 36 from its retracted position to its advanced position and approximately 360° in the opposite direction during a movement of the cylinder part 36 from its advanced position to its retracted position. The actuating rod 34 is at one end articulately connected to the flywheel 33 and at the other end articulately connected to a link 21 of the link arrangement 20. The flywheel 33 is arranged to transfer the rotating motion of the gearwheel 35 into a reciprocating motion of the actuating rod 34. During one revolution of the flywheel 33, the actuating rod 34 is advanced and retracted so as to make the striking arm 11 move from the resting position to the striking position and then back to the resting position. In order to allow an accurate control of the movements of the striking arm 11, the instantaneous position of the rack gearing 37 could be established by suitable sensing means, for instance by means of a Hall effect sensor arranged to detect the position of one or more magnets mounted along the rack gearing 37.

The force for moving the striking arm 11 from the resting position to the striking position could also be accomplished by means of a spring, which is pre-loaded when the striking arm 11 is returned from the striking position to the resting position. The spring is then locked in its pre-loaded state and released by means of suitable trigger. The movement of the striking arm 11 from the striking position to the resting position, and thereby the preloading of the spring could be effected by means of a suitable actuating member, for instance in the form of a hydraulic cylinder.

As a further alternative, the force for moving the striking arm 11 from the resting position to the striking position could also be accomplished by the pulling of a wire or chain wound about a rotary shaft rigidly connected to the striking arm.

The marking device 10 is with advantage secured to a movable support 40, which is movably mounted to the harvesting arrangement 1 so as to allow an adjustment of the position of the striking arm 11 in relation to the end surface 4a of a crosscut end of a tree trunk 4 held by the gripping members 2. In the embodiments illustrated in FIGS. 1-5 and 8-10, the striking arm 11 and the actuating member 30 are mounted to a base 16, which in its turn is secured to the movable support 40. The illustrated support 40 comprises two mutually connected parts 41, 42. A first part 41 is rotatably mounted to a frame part 17 of the harvesting arrangement 1 so as to be rotatable in relation to the frame part 17 about an axis of rotation 43 extending essentially in parallel with the longitudinal axis of a tree trunk held by the gripping members 2 of the harvesting arrangement. The base 16 is fixedly secured to the second part 42 of the support, which second part 42 is displaceably mounted to the first part 41 so as to be displaceable in a direction perpendicular to said axis of rotation 43. The rotation of the first and second parts 41, 42 in relation to the frame part 17 and the displacement of the second part 42 in relation to the first part 41 is accomplished by means of suitable actuating members 44a, 44b. In the illustrated embodiment, a first actuating member 44a in the form of a hydraulic cylinder is arranged on a first side of the second part 42 of the support and a second actuating member 44b in the form of a hydraulic cylinder is arranged on the opposite side of the second part 42 of the support. The respective actuating member 44a, 44b is at one end articulately connected to the base 16 and at its other end articulately connected to a part of the harvesting arrangement 1 which is fixed in relation to the frame part 17. The position of the marking device 10 and thereby the position of the striking head 12 in relation to the end surface 4a of a tree trunk held by the gripping members 2 may be adjusted by means of these actuating members 44a, 44b.

The harvesting arrangement 1 suitably comprises diameter establishing means 45 of any suitable type (schematically indicated in FIG. 2) for establishing information as to the diameter of a tree trunk held by the gripping members 2, and an electronic control unit 46 (schematically indicated in FIG. 2) which is arranged to control the above-mentioned actuating members 44a, 44b of the movable support 40 in dependence on information as to the diameter of a tree trunk 4 held by the gripping members 2 so as to thereby adjust the position of the striking head 12 in relation to the end surface 4a of the tree trunk in dependence on the diameter of the tree trunk.

The striking head 12 is provided with marking means for achieving the desired identification marking on a log. The marking means may be of any suitable type. The marking means suitably comprises several individually adjustable marking members 18, each of which being selectively adjustable between an active marking position, in which the marking member 18 is arranged to apply a mark on the end surface 4a of a tree trunk hit by the striking head 12, and an inactive position, in which the marking member 18 is prevented from applying a mark on the end surface 4a of a tree trunk hit by the striking head. The mark in question could for instance be an indentation or a dot of paint or ink. The marking device 10 is suitably provided with automatically controlled setting means configured to set the positions of said adjustable marking members 18, preferably under the control of an electronic control unit, so as to thereby make it possible to automatically vary the identification marking achieved by the marking members. The striking head 12 could also be provided with means for attaching an information carrier to the end surface 4a of a tree trunk. Such an information carrier could be provided with the identification marking and/or any other desired information and could for instance consist of an RFID-tag (RFID=Radio-frequency identification), for instance in the form of a transponder, an electronic chip, a label etc. The RFID-tags may for instance be provided on a reel actuated by suitable feeding means provided in the marking device.

The striking head 12 is preferably provided with one or more marking members 18 for applying an identification marking by stamping or punching on the end surface 4a of a tree trunk 4 when the striking head 12 hits against said end surface. In this case, the respective marking member 18 is in its active marking position arranged to penetrate into the end surface 4a of a tree trunk hit by the striking head 12 so as to achieve an indentation in the end surface 4a, and in its inactive position prevented from penetrating into the end surface of a tree trunk hit by the striking head. The respective marking member 18 may be movable to and fro between an advanced position corresponding to the above-mentioned active marking position and a retracted position corresponding to the above-mentioned inactive position. The respective marking member 18 may have a rounded outer end so as to facilitate the withdrawal of the marking member from the end surface 4a of a tree trunk hit by the striking head 12.

The striking head 12 may also be provided with a marking member in the form of a valve which is designed to emit paint or ink when the striking head 12 hits against the end surface 4a of a tree trunk so as to thereby apply a dot of paint or ink on the end surface of the tree trunk.

The marking device 10 may be provided with a spring-actuated releasing means 50 for facilitating the withdrawal of the marking members 18 from the end surface 4a of a tree trunk hit by the striking head 12. In the embodiment illustrated in FIGS. 11a and 11b, the releasing means 50 is arranged in the striking head 12 and comprises a releasing member 51 displaceably mounted in a recess 52 in the striking head. In its normal advanced position, the releasing member 51 protrudes from the striking head 12 in the same direction as the marking members 18. The releasing member 51 is urged into this advanced position (see FIG. 11a) by a spring 53 arranged in the recess 52. When the striking head 12 hits against the end surface 4a of a tree trunk, the releasing member 51 will come into contact with the end surface 4a and is thereby pushed from the advanced position to a retracted position (see FIG. 11b) against the action of the spring 53. The spring 53 will then urge the releasing member 51 back into its advanced position and thereby tend to move the striking head 12 backwards out of contact with the end surface 4a of the tree trunk.

A spring-actuated releasing means may additionally or as an alternative be provided on the base 16. In the latter case, the releasing means may comprise a releasing member which comes into contact with the striking arm 11 when the striking arm approaches the striking position. This releasing member is urged into this advanced position by a spring. When the striking arm 11 comes into contact with the releasing member, the releasing member will be pushed from an advanced position to a retracted position against the action of the spring. The spring will then urge the releasing member back into its advanced position and thereby tend to move the striking arm 11 backwards away from the end surface of the tree trunk hit by the striking head 12.

The marking device 10 is suitably mounted between the cutting device 3 and the feeding means 5. In the illustrated embodiments, the cutting device 3 comprises a pivotally arranged saw sword 60 having a saw chain extending around its periphery. The saw sword 60 is in a conventional manner arranged in a so-called saw box 61, which is intended to protect the saw sword and its driving equipment from impacts. The saw sword 60 is in a conventional manner pivotable from a resting position inside the saw box 61 (see FIGS. 4-6) to a swung out position in which the saw sword 60 protrudes outside the saw box (see FIG. 7). The saw sword 60 will be in the swung out position at the moment when the saw sword has cut through a tree trunk held by the gripping members 2, and will thereafter be returned to the resting position before the tree trunk is fed forwards by the feeding means 5. The marking device 10 is preferably so designed that the striking arm 11 may be moved from its resting position to its striking position and then back to the resting position during the short period of time when the saw sword 60 is in the swung-out position. Hereby, the striking arm 11 is allowed to execute its striking motion before the saw sword 60 is returned to its resting position inside the saw box 61 after having cut through a tree trunk. In the embodiments illustrated in FIGS. 4 and 6, the marking device 10 is mounted to the harvesting arrangement 1 is such a manner that the striking arm 11 will cross the resting position of the saw sword 60 when moving from its resting position to its striking position. Thus, in this case no identification marking may be applied on the end surface 4a of a tree trunk when the saw sword 60 is in its resting position. In the embodiment illustrated in FIG. 5, the marking device 10 is mounted to the harvesting arrangement 1 in such a manner that the striking arm 11 will not cross the resting position of the saw sword 60 when moving from its resting position to its striking position. In the latter case, an identification marking may be applied on the end surface 4a of a tree trunk when the saw sword 60 is in its resting position and also when the saw sword is in its swung-out position.

The invention is of course not in any way restricted to the embodiments described above. On the contrary, many possibilities to modifications thereof will be apparent to a person with ordinary skill in the art without departing from the basic idea of the invention such as defined in the appended claims.

The invention claimed is:

1. A harvesting arrangement for tree harvesting comprising gripping members (2) for holding a tree trunk,
a cutting device (3) for crosscutting a tree trunk held by the gripping members (2), and
a marking device (10) for applying an identification marking on an end surface of a crosscut end of a tree trunk held by the gripping members (2), wherein:
the marking device (10) comprises
a striking arm (11) provided with a striking head (12) at its outer free end;
a shaft (15); and
an actuating member (30, 30', 30") for actuating the striking arm (11); wherein
the striking arm (11) is pivotable about an axis of rotation (14) defined by the shaft (15) by the actuating member (30, 30', 30") from a resting position in which the striking head (12) faces in one direction to a striking position in which the striking head (12) faces in an opposite direction towards the end surface of the cross-cut end of the tree trunk to hit against the end surface of the crosscut end of the tree trunk held by the gripping members (2) and apply an identification marking on said end surface.

2. A harvesting arrangement according to claim 1, wherein the actuating member (30, 30', 30") is arranged to act on the striking arm (11) through a link arrangement (20), which is configured to accelerate the striking arm (11) during the final part of the striking arm's travel path from the resting position to the striking position.

3. A harvesting arrangement to claim 2, wherein the link arrangement (20) is configured to decelerate the striking arm (11) during the final part of the striking arm's travel path from the striking position to the resting position.

4. A harvesting arrangement according to claim 1, wherein the striking arm (11) is fixedly secured to the rotatably mounted shaft (15).

5. A harvesting arrangement according to claim 4, wherein:
the actuating member (30, 30', 30") is arranged to act on the striking arm (11) through a link arrangement (20), which is configured to accelerate the striking arm (11) during the final part of the striking arm's travel path from the resting position to the striking position;
the link arrangement (20) comprises a first link (21), a second link (22) and a third link (23) arranged in series with each other between a base (16) and the shaft (15);
the first link (21) has a first end articulately connected to the base (16) through a first joint (24) and a second end articulately connected to a first end of the second link (22) through a second joint (25);
the second link (22) has a second end articulately connected to a first end of the third link (23) through a third joint (26);
the third link (23) has a second end fixedly secured to the shaft (15);
each one of said first, second and third joints (24-26) forms an axis of rotation extending in parallel with the axis of rotation (14) of the shaft (15); and
the actuating member (30, 30', 30") is arranged to act on the first link (21) or the second link (22).

6. A harvesting arrangement according to claim 1, wherein the actuating member (30; 30") is a hydraulic cylinder.

7. A harvesting arrangement according to claim 1, wherein the actuating member (30') is a hydraulic motor or pump.

8. A harvesting arrangement according to claim 1, wherein the marking device (10) is secured to a movable support (40), which is movably mounted to the harvesting arrangement (1) to allow an adjustment of the position of the striking arm (11) in relation to the end surface of a crosscut end of a tree trunk held by the gripping members (2).

9. A harvesting arrangement according to claim 8, wherein:
the harvesting arrangement (1) comprises diameter establishing means (45) for establishing information as to the diameter of a tree trunk held by the gripping members (2);
the harvesting arrangement (1) comprises one or more actuating members (44a, 44b) for regulating the position of the movable support (40); and
the harvesting arrangement (1) comprises an electronic control unit (46) which is arranged to control said one or several actuating members (44a, 44b) in dependence on information as to the diameter of a tree trunk held by the gripping members.

10. A harvesting arrangement according to claim 1, wherein the striking head (12) is provided with one or more marking members (18) for applying an identification marking by stamping or punching on the end surface of a crosscut end of a tree trunk held by the gripping members when the striking head (12) hits against said end surface.

11. A harvesting arrangement for tree harvesting comprising
gripping members (2) for holding a tree trunk, a cutting device (3) for crosscutting a tree trunk held by the gripping members (2) and a marking device (10) for applying an identification marking on the end surface of a crosscut end of a tree trunk held by the gripping members (2), wherein:
the marking device (10) comprises a striking arm (11) provided with
a striking head (12) at its outer free end;
a shaft (15); and
an actuating member (30, 30', 30") for actuating the striking arm (11);
wherein
the striking arm (11) is pivotable about an axis of rotation (14) defined by the shaft (15) by the actuating member (30, 30', 30") from a resting position in which the striking head (12) faces in one direction to a striking position in which the striking head (12) faces in an opposite direction towards the end surface of the cross-cut end of the tree trunk to hit against the end surface of the crosscut end of the tree trunk held by the gripping members (2) and apply an identification marking on said end surface;
the striking arm (11) is fixedly secured to a rotatably mounted shaft (15);
the actuating member (30, 30', 30") is arranged to act on the striking arm (11) through a link arrangement (20), which is configured to accelerate the striking arm (11) during the final part of the striking arm's travel path from the resting position to the striking position;
the link arrangement (20) comprises a first link (21), a second link (22) and a third link (23) arranged in series with each other between a base (16) and the shaft (15);
the first link (21) has a first end articulately connected to the base (16) through a first joint (24) and a second end articulately connected to a first end of the second link (22) through a second joint (25);
the second link (22) has a second end articulately connected to a first end of the third link (23) through a third joint (26);
the third link (23) has a second end fixedly secured to the shaft (15);
each one of said first, second and third joints (24-26) forms an axis of rotation extending in parallel with the axis of rotation (14) of the shaft (15); and
the actuating member (30, 30', 30") is arranged to act on the first link (21) or the second link (22; and
the actuating member (30; 30") is a hydraulic cylinder.

12. A harvesting arrangement according to claim 1, wherein the axis of rotation (14) is oriented to extend perpendicularly to a longitudinal direction of the tree trunk held by the gripping members (2).

13. A harvesting arrangement according to claim 1, additionally comprising a support member (19) against which the striking arm (12) is arranged to rest when the striking arm (12) is in the resting position.

14. A harvesting arrangement according to claim 5, wherein the actuating member is a hydraulic cylinder (30) having a cylinder part (31) articulately connected to the base (16) and a piston rod (32) articulately connected to the first link (21).

15. A harvesting arrangement according to claim 5, where the actuating member comprises a hydraulic motor or pump (30'), a flywheel (33) and a reciprocating actuating rod (34),
the hydraulic motor or pump (30') having an output shaft connected to the flywheel (33), and
the reciprocating actuating rod (34) articulately connected, at one end, to the flywheel (33) and, at an opposite end, to the first link (21).

16. A harvesting arrangement according to claim 5, where the actuating member comprises a hydraulic cylinder (30"), a gearwheel (35), a flywheel (33) and a reciprocating actuating rod (34),
the flywheel (33) and gearwheel (35) arranged on a common shaft to rotate together,
the hydraulic cylinder (30") having a cylinder part (36) cogged to form a rack gearing (37) engaged with the gearwheel (35), and
the reciprocating actuating rod (34) articulately connected, at one end, to the flywheel (33) and, at an opposite end, to the first link (21).

17. A harvesting arrangement according to claim 8, wherein the movable support (40) comprises two mutually connected parts (41, 42),
a first part (41) rotatably mounted on a frame part (17) of the harvesting arrangement (1) about an axis of rotation (43) extending substantially parallel with a longitudinal axis of a tree trunk held by the gripping members (2), and
a second part (42) secured to a base (16) and displaceably mounted with respect to the first part (41) in a direction perpendicular to the axis of rotation (43).

18. A harvesting arrangement according to claim 1, additionally comprising spring-actuated releasing means (50) arranged in the striking head (12) and comprising
a releasing member (51) displaceably mounted in a recess (52) in the striking head (12) to protrude therefrom in a normal advanced position, and
a spring (53) arranged in the recess (52) to urge the releasing member (51) into the advanced position.

19. A harvesting arrangement according to claim 1, additionally comprising
means (5) for feeding the tree trunk through the gripping members (2),
wherein the marking device (10) is mounted between the cutting device (3) and feeding means (5).

20. A harvesting arrangement according to claim 1, wherein the cutting device (3) comprises
a pivotally-arranged saw (60), and
a saw box (61) arranged to contain the saw (60) which is pivotally-arranged to project from the saw box (61).

21. A harvesting arrangement according to claim 20, wherein the striking arm (11) is arranged to move between the resting and striking positions while the saw (60) projects from the saw box (61).

22. A harvesting arrangement according to claim 20, wherein the striking arm (11) is arranged, when moving from the resting to striking position, to cross a resting position of the saw (60).

23. A harvesting arrangement according to claim 20, wherein the striking arm (11) is arranged, when moving from the resting to striking position, to avoid crossing a resting position of the saw (60).

24. A harvesting arrangement according to claim 4, wherein the striking arm (11) comprises two parallel shanks (11a, 11b) extending between the shaft (15) and striking head (12).

25. A harvesting arrangement according to claim 1, wherein the striking head (12) faces downwardly in resting position and upwardly in striking position.

26. A harvesting arrangement according to claim 1, wherein the striking arm (11) pivots approximately 180° between resting and striking positions.

* * * * *